(12) United States Patent
Peng et al.

(10) Patent No.: US 12,085,532 B2
(45) Date of Patent: Sep. 10, 2024

(54) ENHANCED CHLORIDE SELECTIVE MEMBRANE

(71) Applicant: Siemens Healthcare Diagnostics Inc., Tarrytown, NY (US)

(72) Inventors: Bo Peng, Boulder, CO (US); David Thompson, Kennett Square, PA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 18/357,992

(22) Filed: Jul. 24, 2023

(65) Prior Publication Data

US 2023/0366850 A1 Nov. 16, 2023

Related U.S. Application Data

(63) Continuation of application No. 17/652,937, filed on Mar. 1, 2022, now Pat. No. 11,747,297, which is a continuation of application No. 15/572,000, filed as application No. PCT/US2016/032814 on May 17, 2016, now Pat. No. 11,293,892.

(60) Provisional application No. 62/162,843, filed on May 18, 2015.

(51) Int. Cl.
*G01N 27/333* (2006.01)
*G01N 27/30* (2006.01)
*G01N 27/414* (2006.01)

(52) U.S. Cl.
CPC ....... *G01N 27/3335* (2013.01); *G01N 27/301* (2013.01); *G01N 27/414* (2013.01)

(58) Field of Classification Search
CPC ....... G01N 27/335; G01N 27/414–417; G01N 27/301; G01N 27/4167; G01N 27/4166; G01N 27/302; G01N 27/333; G01N 27/3335
See application file for complete search history.

(56) References Cited

U.S. PATENT DOCUMENTS

| | | | |
|---|---|---|---|
| 4,035,274 A | 7/1977 | McGinniss | |
| 4,758,325 A | 7/1988 | Kanno | |
| 5,057,557 A | 10/1991 | Treybig | |
| 5,102,527 A | 4/1992 | Shibata et al. | |
| 6,015,480 A | 1/2000 | Craig et al. | |
| 6,340,714 B1 | 1/2002 | Ghahramani et al. | |
| 6,767,450 B2 | 7/2004 | Terashima et al. | |
| 7,384,523 B2 | 6/2008 | Samproni | |
| 11,293,892 B2* | 4/2022 | Peng | G01N 27/3335 |
| 11,747,297 B2* | 9/2023 | Peng | G01N 27/3335 204/418 |
| 2005/0241958 A1 | 11/2005 | Shin | |
| 2012/0077903 A1 | 3/2012 | Yamagami et al. | |
| 2014/0158536 A1 | 6/2014 | Thompson | |
| 2015/0096516 A1 | 4/2015 | Fang et al. | |

FOREIGN PATENT DOCUMENTS

| | | |
|---|---|---|
| CN | 104374814 A | 9/2015 |
| JP | 2003215087 A | 7/2003 |
| KR | 20040032429 A | 4/2004 |
| WO | 2014092543 A1 | 6/2014 |

OTHER PUBLICATIONS

International Search Report and Written Opinion of International Application No. PCT/US2016/032814 dated Aug. 16, 2016.
Shin et al., "Characterization of Epoxy Resin-Based Anion-Responsive Polymers: Applicability to Chloride Sensing in Physiological Samples", Jul. 15, 2004, Analytical Chemistry, vol. 76, No. 14, pp. 4217-4222.
European Search Report and Written Opinion of European Application No. 16797130.8 dated May 29, 2018.
DER 331 Product Sheet, Mar. 26, 2015.

* cited by examiner

*Primary Examiner* — Gurpreet Kaur

(57) ABSTRACT

There is provided a chloride selective membrane including an epoxide-based matrix reacted with a stoichiometric amount of an amino compound and an activator such that the epoxide-based matrix comprises a number of quaternary ammonium groups.

9 Claims, 2 Drawing Sheets

ENHANCED CHLORIDE SELECTIVE MEMBRANE

CROSS REFERENCE TO RELATED APPLICATIONS

The subject application is a continuation of U.S. Ser. No. 17/652,937, filed Mar. 1, 2022; which is a continuation of U.S. Ser. No. 15/572,000, filed Nov. 6, 2017, now U.S. Pat. No. 11,293,892, issued Apr. 5, 2022; which is a US national stage application under 35 USC § 371 of International Application No. PCT/US2016/032814, filed May 17, 2016; which claims benefit under 35 USC § 119(e) of U.S. Provisional Application No. 62/162,843, filed May 18, 2015. The entire contents of the above-referenced patent applications are hereby expressly incorporated herein by reference.

TECHNICAL FIELD

This disclosure relates generally to the field of diagnostic testing, and more particularly to improved chloride selective membranes, electrodes incorporating the same, and processes for making the same.

BACKGROUND

Ion selective electrodes (ISEs) typically comprise a plasticized polymer matrix comprising an ionophore or other ionic species selective for the ion of interest. Ion selective electrodes have been developed, for example, for the detection and/or determination of sodium ($Na^+$), potassium ($K^+$), magnesium ($Mg^{2+}$), calcium ($Ca^{2+}$), and chloride ($Cl^-$).

In a number of diagnostic assays for such ionic species, interferents that may provide a positive or negative bias for the analyte of interest are of particular concern. As such, one requirement is that the relevant ion selective electrodes provide sufficient selectivity for a particular ion. In addition, it is now understood that certain types of samples may adversely affect ion selective electrodes. For example, chloride ion selective electrodes have been shown to be prone to the extraction of plasticizers and ionophores out of the membrane by certain compounds, thereby causing the sensitivity of the membrane to be compromised. Further, particularly with biological fluids such as serum, urine, plasma, and whole blood, it is believed that lipophilic anionic species such as bicarbonate, salicylate, and heparin may further interfere with chloride detection by binding to active sites on the membrane of the electrode.

U.S. Pat. No. 7,384,523 proposed one solution for a chloride sensor having a chloride selective membrane, the chloride selective membrane comprising an epoxy resin and an amine agent selected from polyamides, amidoamines, and mixtures thereof. In order to provide sufficient quaternary amine functional groups for the detection of chloride, the amine agent is provided in stoichiometric excess. Further solutions for providing chloride sensors with improved sensitivity, stability, reproducibility, and use life are needed.

BRIEF DESCRIPTION OF THE DRAWINGS

The invention is explained in the following description in view of the drawings that show.

DETAILED DESCRIPTION

Figure 1:
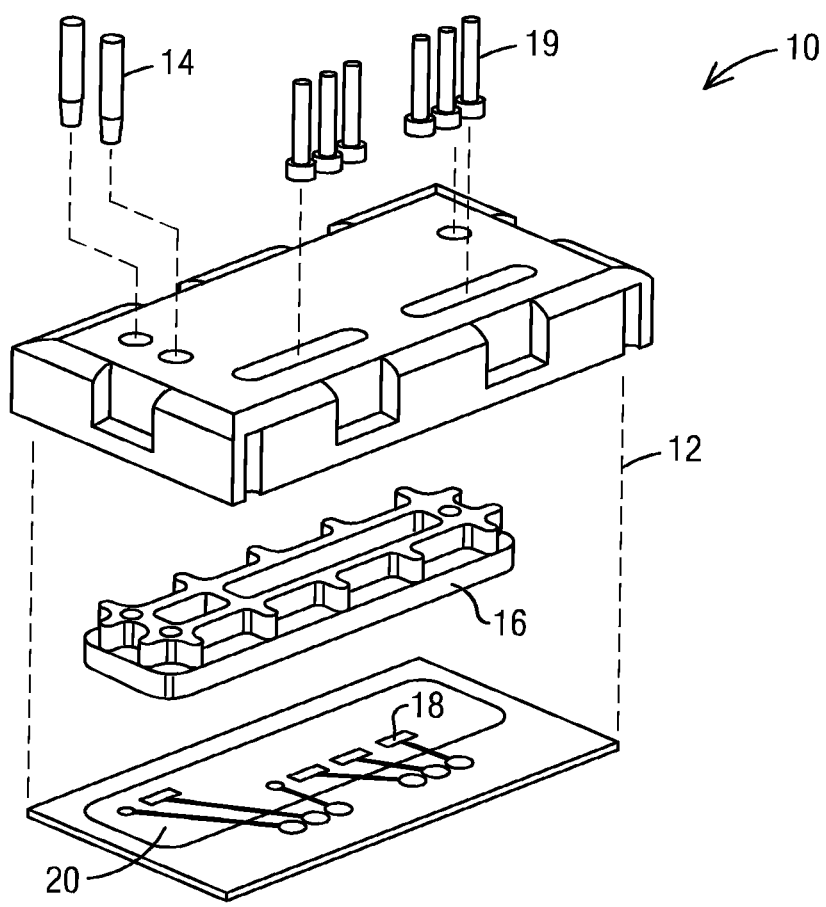
FIG. 1 shows an exemplary sensor comprising a chloride selective membrane in accordance with an aspect of the present invention.

In one aspect, the present inventors have developed chloride selective membranes comprising an epoxide-based matrix reacted with a stoichiometric amount of an amino compound and an activator such that the epoxide-based matrix comprises a number of quaternary ammonium groups. The reaction between the quaternary ammonium sites and chloride in a sample generates a potentiometric signal, which is utilized to determine an amount of chloride in the sample. The membranes as described herein exhibit excellent sensitivity, stability, reproducibility, and improved use life for the ion selective electrode, particularly with biological samples. In one aspect, the membranes as described herein may form a structural barrier that substantially limits diffusion of potential lipophilic interferents such as bicarbonate, salicylate, heparin, and proteins into the membranes so as to improve the use life and performance of the membranes.

In accordance with another aspect, there is provided a chloride selective membrane comprising stoichiometric amounts of an epoxy resin, an amino compound, and an activator, wherein the activator promotes reactions between the components to provide the membrane with a plurality of quaternary functional groups.

In accordance with another aspect, there is provided a process for forming a chloride sensitive membrane comprising combining stoichiometric amounts of an epoxy resin, an amino compound, and an activator, wherein the activator promotes reactions between the components to provide the membrane with a plurality of quaternary functional groups.

As used herein, the term "about" refers to a value that is ±10% of the stated value.

As used herein, the term "alkyl" refers to a saturated aliphatic hydrocarbon chain and a substituted saturated aliphatic hydrocarbon chain that can be either straight-chain or branched-chain.

As used herein, the term "aryl" refers to a group containing a single aromatic ring or multiple aromatic rings that are fused together, directly linked, or indirectly linked.

As used herein, by the phrase "effective amount," it is meant an amount of material suitable for bringing about an intended result.

As used herein, the term "stoichiometric amount" refers to an amount of a component theoretically needed to react with all of the reactive group(s) of at least a second component.

The epoxide-based matrix of the membrane may comprise any composition (e.g., compound, polymer, or the like) comprising one or more epoxide groups which may be reacted with an amino compound, an activator, and/or a product of a reaction between the amino compound and the activator as described herein. In an embodiment, the epoxide-based matrix comprises an epoxy resin having a predetermined number of epoxide groups per molecule. For example, in an embodiment, the epoxy resin may have more than one epoxide group per molecule and in another embodiment, more than about 1.5 epoxide groups per molecule. Also, the epoxy resin may be saturated or unsaturated, linear or branched, aliphatic, cycloaliphatic, aromatic or heterocyclic, and substituted or unsubstituted. Exemplary epoxy resins for use herein include but are not limited to 2,2-bis (4-hydroxyphenyl) propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; and 1,1-bis(4-hydroxy-3-alkylphenyl) ethane. Numerous epoxy resins are commercially available and may be used in the membranes described herein such as EPON™ epoxy resins available from Resolution Performance Products; DER™ epoxy resins available from Dow Chemical Company; and Araldite™ epoxy resins available from Huntsman Advanced Materials. In a particular embodiment, the epoxy resin may comprise DER™ 331, which comprises liquid reaction product between epichlorohydrin and bisphenol A (DER 331). The present inventors have found that DER™ 331 provides a particularly stable epoxide-based matrix for the membranes described herein.

The amino compound may comprise any suitable compound comprising one or more amino groups which will react with the epoxide groups of the epoxide-based matrix. The amino compounds may comprise a primary amine, second amine, and/or a tertiary amine. While primary and/or secondary amines may be provided in the membranes since primary and/or second amines may ultimately be converted to the desired quaternary ammonium sites in successive reactions, in an embodiment, the amino compound comprises a tertiary amine which may be directly converted to the desired quaternary ammonium sites. Starting with tertiary amines allows for a single step to provide the desired quaternary ammonium sites and simplifies the reactions necessary to produce the desired membranes.

In an aspect, the tertiary amine comprises a polyamine, wherein an unsaturated and unsubstituted carbon chain is present between two adjacent amino groups in the polyamine. While not wishing to be bound by theory, it is believed that the larger the carbon chain, the more rigid the resulting chemical network. A rigid chemical network may aid in forming a structural barrier to prevent interferents such as bicarbonate, salicylate, and heparin from penetrating the membrane.

In certain embodiments, the amino compound may comprise a diamine. In this way, the amino compound may again comprise multiple amino groups, which during reaction with the epoxide groups of the epoxide-based matrix, may provide the desired quaternary ammonium sites. The quaternary ammonium sites are selective for chloride in a sample. In an embodiment, the quaternary ammonium sites may be of the formula:

NR$_4^+$, wherein R=hydrogen, an alkyl group, or an aryl group, for example.

In a particular embodiment, the amino compound may comprise a tertiary polyamine such as a tertiary diamine. Exemplary tertiary polyamines for use herein include but are not limited to N,N,N',N'-Tetramethyl-1,6-hexanediamine (TMHA), N,N,N',N'-Tetramethyl-2-butene-1,4-diamine (TMBEA), and N,N,N',N'-Tetramethyl-1,4-butanediamine (TMBA).

The activator may comprise any suitable compound which accelerates the production of quaternary functional groups in the epoxide-based matrix relative to a process without the activator. In an embodiment, the activator comprises a compound which reacts with the amino compound to produce two ionic species, each of which will react with the epoxide-group containing monomers or compounds provided by the epoxide-based matrix. In an embodiment, the activator comprises a mercaptan compound. In a particular embodiment, the activator comprises a polymercaptan compound such as a polymercaptan having four thiol groups. Exemplary polymercaptans include but are not limited to pentaerythritol tetrakis (3-mercaptopropionate), trimethylolpropane tris(3-mercaptopropionate), and ethylene glycol bis (3-mercaptopropionate). While not wishing to be bound by theory, it is also believed the activator may contribute to maintaining the desired structure in the epoxide-based matrix. The tridimensional structure of the epoxide-based matrix may be a contributing factor in how effective the matrix is as a barrier to potential interferents such as bicarbonate, salicylate, and heparin. A more limited porosity, for example, will aid in acting as a barrier to the interferents.

In certain embodiments, the amino compound may be protonated by the activator to provide a pair of reactive species, each of which may react with epoxide group-containing compounds to ultimately produce the desired epoxide-based matrix having quaternary functional groups. In a particular exemplary embodiment, the preparation of the membrane takes place according to the following reactions.

First, an effective amount of the amino compound and the activator react to provide a pair of reactive ionic species:

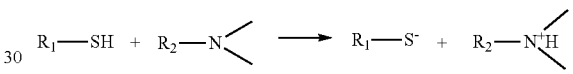

This may be referred to as the "activation stage." Following this, the reactive species may react with epoxide monomers of the epoxide-based matrix according to the following reactions ("polymerization stage"):

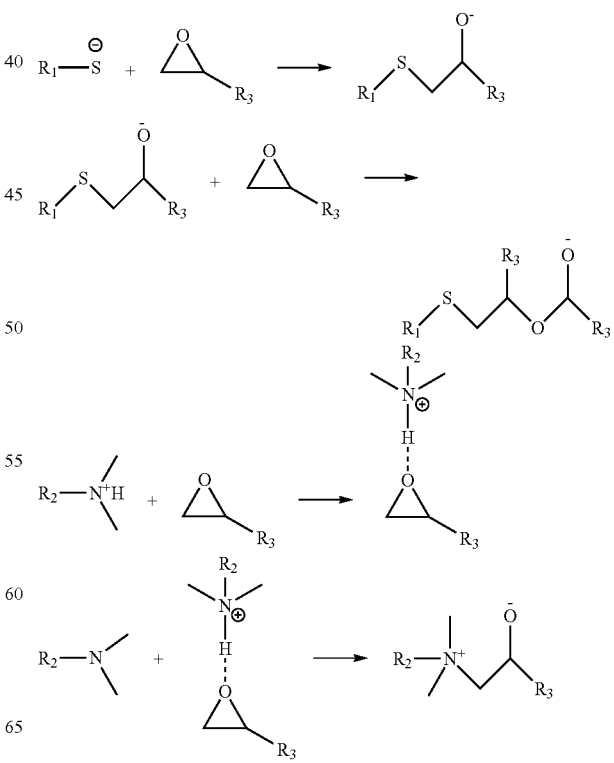

-continued

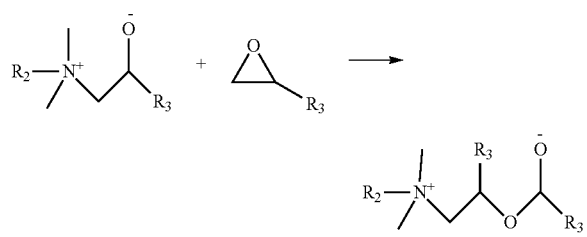

In the above reactions, in one embodiment, $R_1$ may be an alkyl group; $R_2$ may comprise an alkyl group; and $R_3$ may comprise a diglycidal ether.

In accordance with an aspect of the present invention, the amino compound, the activator, and epoxide-based resin are provided in stoichiometric amounts relative to one another. As noted above, known epoxy-based chloride selective membranes believed it necessary to employ a stoichiometric excess of components to provide the desired quaternary ammonium functional groups for the membrane. Aspects of the present invention provide a membrane with sufficient quaternary ammonium groups via use of stoichiometric amounts of the reactants only, thereby realizing material and production time and cost savings.

In one aspect, the amino compound and the activator are provided in a stoichiometric amount relative to the number of epoxide groups in the epoxide-based matrix. In an embodiment, this stoichiometric amount is in a range of from 0.5:1 to about 1.5:1, such as about 1:1.

In another aspect, the amino compound and the activator may be provided in stoichiometric amounts relative to one another. In an embodiment, the stoichiometric ratio of the amino compound relative to an amount of the activator may also be from about 0.5:1 to about 1.5:1, such as about 1:1.

In certain embodiments, the membrane may further include an effective amount of a solvent for the components of the membrane in order to bring the membrane to a suitable viscosity for placement on an associated substrate for production of an electrode. In an embodiment, the solvent comprises an organic solvent utilized for known ion selective membranes, such as benzaldehyde, cyclohexanone, isophorone, xylene, tetrahydrofuran, toluene, or the like.

The various embodiments of the chloride selective membranes as described herein may be incorporated into any suitable structure for an ion selective electrode and/or sensor as are well known in the art to form a chloride sensitive electrode. Typically, the described chloride selective membrane is produced by dispensing the membrane (or components thereof separately to form the membrane) on an inert substrate as is known in the art to form a portion of the electrode. In certain embodiments, the membrane may be applied as a layer in an electrode along with a polymer layer, an electrode layer, a conductor layer, and/or a transducer layer on a substrate. Exemplary structures into which the membranes described herein may be incorporated are further set forth in U.S. Pat. Nos. 7,384,523; 6,767,450; and 5,102,527; U.S. Published Patent Application No. 20140158536; and WO2014092543 A1, for example. The entirety of each of these references is hereby incorporated by reference.

FIG. 1 shows an exemplary sensor 10 comprising a chloride selective membrane as described herein. The sensor 10 comprises a housing 12, which may be formed from any suitable inert material. Disposed within the housing 12 are fluid connectors 14 and electrical connectors 19 as are known in the art. The fluid connectors 14 allow for introduction of a sample and/or other fluids into the sensor 10 and travel of the sample and/or other fluids to a fluid channel member 16. A sensor plate 20 comprising a chloride selective membrane 18 as described herein is arranged such that a sample introduced to the sensor 10 travels to the fluid channel member 16 and over the sensor plate 20. In an embodiment, the sensor plate 20 comprises a ceramic substrate or other substrate formed from an inert material. The electrical connectors 19 are configured to detect a potentiometric signal generated upon reaction between the quaternary ammonium sites on the membrane 18 and chloride in the sample. The signal may be delivered to a data collection system as is known in the art for processing.

In accordance with another aspect, the electrode comprising a chloride selective membrane as described herein may be disposed in a cartridge employing a plurality of additional electrodes for the detection of at least one ionic species selected from the group consisting of sodium, potassium, magnesium, and calcium, or the like, for example. In still other embodiments, the electrode comprising a chloride selective membrane as described herein may be disposed in a cartridge employing a plurality of additional electrodes for the detection of one or more species or properties such as one or more of pH, potassium ion, sodium ion, magnesium ion, and the like, for example.

Electrodes comprising the chloride selective membranes as described herein are suitable for use with any samples suspected of having an amount of chloride therein. In an embodiment, the electrodes are suitable for use with biological samples. The biological sample may be from a human or non-human subject. Moreover, the sample may be derived from whole blood, serum, plasma, sputum, lymphatic fluid, semen, vaginal mucus, feces, urine, spinal fluid, saliva, stool, cerebral spinal fluid, tears, mucus, and the like; biological tissue such as hair, skin, sections or excised tissues from organs or other body parts; and so forth. It is appreciated that the sample may undergo any pre-treatment or preparation necessary to submit the sample to the electrode would be appreciated by one skilled in the art.

In another aspect, there is provided processes for forming a chloride sensitive membrane having the components described above. In an embodiment, the process comprises combining stoichiometric amounts of an epoxy resin, an amino compound, and an activator, wherein the activator promotes reactions between the components to provide the membrane with a plurality of quaternary functional groups. In certain embodiments, the amino compound and activator may be combined and allowed to react prior to their combination with the epoxy resin.

Aspects of the present invention are demonstrated by the following examples, which are not intended to be limiting in any manner.

EXAMPLES

Example 1: Preparation of a Chloride Sensor Membrane and Electrode

Preparation of a Chloride Ion Selective Membrane Sensor

Modified bispenol A epoxide resin (DER 331) (Dow Chemical (Midland, MI)), N,N,N',N'-Tetramethyl-1,6-hexanediamine (TMHA), pentaerythritol tetrakis (3-mercaptopropionate), were purchased from Sigma Aldrich (St. Louis, MO). Stoichiometric amount of epoxy resin and curing agent (tertiary amine and mercaptan) was calculated from the average equivalent epoxide or amine hydrogen weight (EEW or AHEW) of each component. Into a 20 ml glass vial, 1.9 g DER 331, 0.61 g pentaerythritol tetrakis (3-mercaptopropionate), 0.43 g N,N,N',N'-Tetramethyl-1,6-hexanediamine (TMHA) were added. A 0.5 mL of solvent THF was added and stirred to create a homogenous mixture. The mixture was manually or automatically coated onto the surface of an Ag/AgCl electrode on a disposable ceramic substrate. The substrate was heated at 80 C for 5 minutes to facilitate the cross-linking reaction.

Example 2: Epoxy-Based Chloride Sensor Selectivity

The above-mentioned substrate with epoxy membrane was mounted into a plastic cartridge with a rubber fluid channel membrane. The finished product was tested on a Siemens Dimension Vista Clinical Chemistry Analyzer. It was auto-calibrated every 4 hours during a 14 days stability study. The selectivity of such chloride sensor was measured against a spiked horse serum sample of high levels of salicylate (60 mg/dL).

Figure 2:
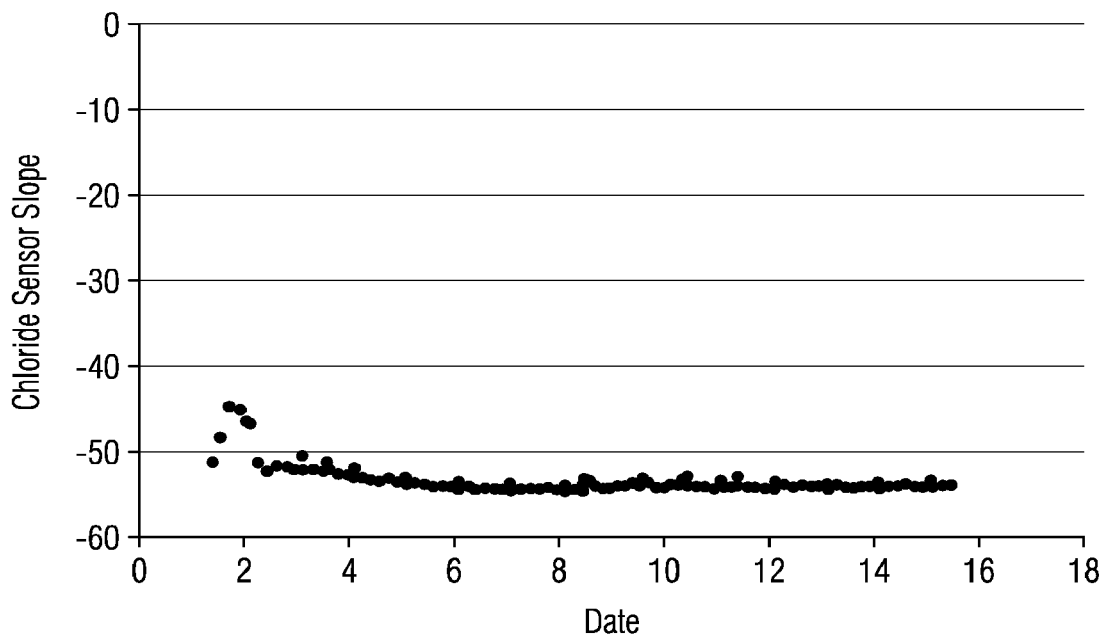
FIG. 2 shows the two-week stability of a sensor calibrated every 4 hours in simulated serum samples. in accordance with an aspect of the present invention.

FIG. 2 shows the two-week stability of a sensor formed according to Example 1 calibrated every 4 hours in simulated serum samples (x axis=days).

Figure 3:
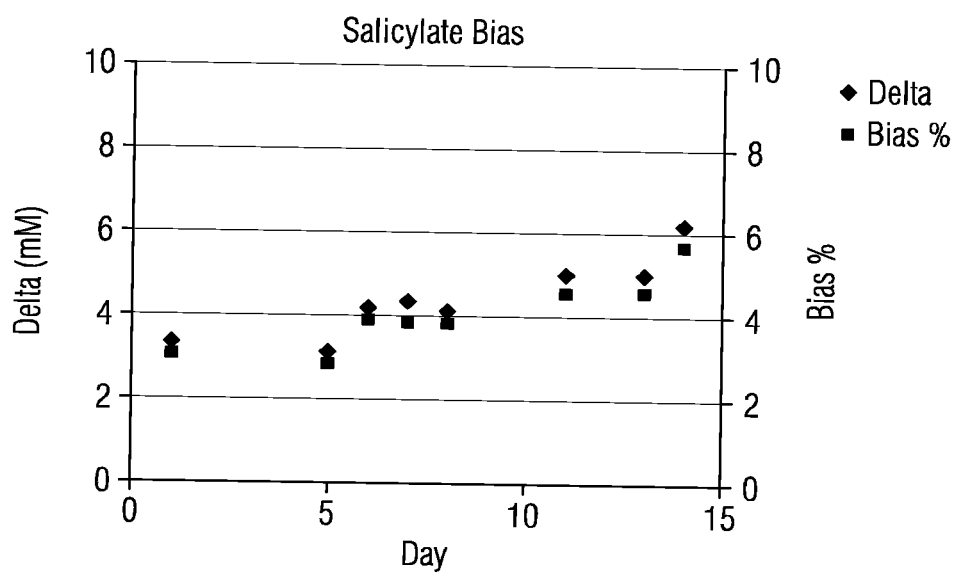
FIG. 3 shows <10% interference from 60 mg/dl salicylate spiked serum samples for a sensor over a period of 15 days in accordance with another aspect of the present invention.

FIG. 3 shows <10% interference of a sensor upon exposure to a 60 mg/dl salicylate spiked serum samples over a period of 15 days.

Example 3: Epoxy-Based Chloride Sensor Selectivity

Heparin in plasma sample could degrade conventional ISE sensors by penetrating into the selective PVC membrane and therefore results in a sensitivity degradation and/or false recovery. In this example, a high volume of 5000 plasma sample was measured using the proposed epoxy chloride sensor. During a 14-day study, 500 plasma samples were measured every day. The sensor maintained a stable slope and recovered with minimal bias.

Figure 4:
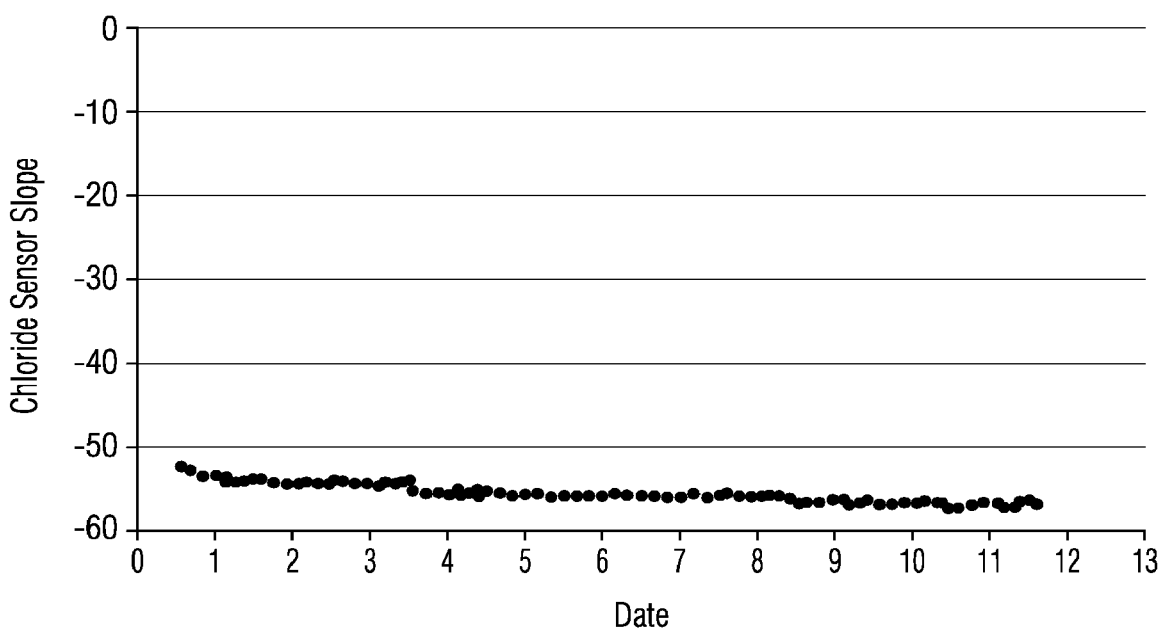
FIG. 4 illustrates the stability of a chloride sensor upon exposure to heparinized plasma samples in accordance with another aspect of the present invention.

FIG. 4 illustrates the stability of the sensor formed according to Example 1 upon exposure to heparinized plasma samples in accordance with an aspect of the present invention (x axis=days).

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention is a chloride selective electrode comprising a chloride selective membrane. The chloride selective membrane comprises an epoxide-based matrix reacted with a stoichiometric amount of an amino compound and an activator such that the epoxide-based matrix comprises a number of quaternary ammonium groups.

The amino compounds of the membrane may comprise a tertiary amine. The tertiary amine may be a member selected from the group consisting of N,N,N',N'-Tetramethyl-1,6-hexanediamine (TMHA), N,N,N',N'-Tetramethyl-2-butene-1,4-diamine (TMBEA), and N,N,N',N'-Tetramethyl-1,4-butanediamine (TMBA). Further, the tertiary amine may comprise a polyamine, wherein an unsaturated and unsubstituted carbon chain is present between two amino groups in the polyamine.

The activator of the membrane may comprise a mercaptan compound. The mercaptan compound may comprise a member selected from the group consisting of pentaerythritol tetrakis (3-mercaptopropionate), trimethylolpropane tris(3-mercaptopropionate), and ethylene glycol bis(3-mercaptopropionate).

The epoxide-based matrix of the membrane may comprise an epoxy resin. Further, the epoxy resin may comprise a liquid reaction product between epichlorohydrin and bisphenol A (DER 331).

The amino compound to the activator in the membrane may comprise a stoichiometric ratio from about 0.5:1 to about 1.5:1, including a ratio of 1:1.

The amino compound and the activator relative to the number of epoxide groups in the epoxide-based matrix in the membrane may comprise a stoichiometric ratio from about 0.5:1 to about 1.5:1, including a ratio of 1:1.

The above chloride selective electrodes may be part of a sensor assembly which also comprises at least one additional sensor for detecting an ionic species selected from the group consisting of sodium, potassium, magnesium, and calcium.

In another embodiment, the invention is a chloride selective electrode comprising a chloride selective membrane, the membrane comprising stoichiometric amounts of an epoxide-based matrix, an amine, and an activator, wherein the activator promotes reactions between the components to provide the membrane with a plurality of quaternary functional groups.

The amino compounds of the membrane may comprise a tertiary amine. The tertiary amine may be a member selected from the group consisting of N,N,N',N'-Tetramethyl-1,6-hexanediamine (TMHA), N,N,N',N'-Tetramethyl-2-butene-1,4-diamine (TMBEA), and N,N,N',N'-Tetramethyl-1,4-butanediamine (TMBA). Further, the tertiary amine may comprise a polyamine, wherein an unsaturated and unsubstituted carbon chain is present between two amino groups in the polyamine.

The activator of the membrane may comprise a mercaptan compound. The mercaptan compound may comprise a member selected from the group consisting of pentaerythritol tetrakis (3-mercaptopropionate), trimethylolpropane tris(3-mercaptopropionate), and ethylene glycol bis(3-mercaptopropionate).

The epoxide-based matrix of the membrane may comprise an epoxy resin. Further, the epoxy resin may comprise a liquid reaction product between epichlorohydrin and bisphenol A (DER 331).

The amino compound to the activator in the membrane may comprise a stoichiometric ratio from about 0.5:1 to about 1.5:1, including a ratio of 1:1.

The amino compound and the activator relative to the number of epoxide groups in the epoxide-based matrix in the membrane may comprise a stoichiometric ratio from about 0.5:1 to about 1.5:1, including a ratio of 1:1.

The above chloride selective electrodes may be part of a sensor assembly which also comprises at least one additional sensor for detecting an ionic species selected from the group consisting of sodium, potassium, magnesium, and calcium.

A further embodiment is a process for forming a chloride sensitive membrane comprising:
  combining stoichiometric amounts of an epoxide-based matrix, an amino compound, and an activator, wherein the activator promotes reactions between the components to provide the membrane with a plurality of quaternary functional groups.

The combining step may comprise combining the amino compound and the activator to allow the amino compound and the activator to react; and adding the reacted amino compound and activator to the epoxide-based matrix to form the plurality of quaternary functional groups.

In the process, the amino compounds may comprise a tertiary amine. The tertiary amine may be a member selected from the group consisting of N,N,N',N'-Tetramethyl-1,6-hexanediamine (TMHA), N,N,N',N'-Tetramethyl-2-butene-1,4-diamine (TMBEA), and N,N,N',N'-Tetramethyl-1,4-butanediamine (TMBA). Further, the tertiary amine may comprise a polyamine, wherein an unsaturated and unsubstituted carbon chain is present between two amino groups in the polyamine.

In the process, the activator may comprise a mercaptan compound. The mercaptan compound may comprise a member selected from the group consisting of pentaerythritol tetrakis (3-mercaptopropionate), trimethylolpropane tris(3-mercaptopropionate), and ethylene glycol bis(3-mercaptopropionate).

In the process, the epoxide-based matrix may comprise an epoxy resin. Further, the epoxy resin may comprise a liquid reaction product between epichlorohydrin and bisphenol A (DER 331).

In the process, the amino compound to the activator in the membrane may comprise a stoichiometric ratio from about 0.5:1 to about 1.5:1, including a ratio of 1:1. Further, the amino compound and the activator relative to the number of epoxide groups in the epoxide-based matrix in the membrane may comprise a stoichiometric ratio from about 0.5:1 to about 1.5:1, including a ratio of 1:1.

What is claimed is:

1. A process of detecting chloride in at least one biological sample, the process comprising the steps of:
    contacting a chloride selective electrode with at least one biological sample, wherein the chloride selective electrode comprises a chloride selective membrane provided with a plurality of quaternary functional groups, and wherein the chloride selective membrane comprises:
        an epoxide-based matrix comprising an epoxy resin having a predetermined number of epoxide groups per molecule; and
        a mixture of an amino compound and an activator dispensed onto a surface of the epoxide-based matrix, wherein the amino compound and activator are present in the mixture in a stoichiometric amount relative to the number of epoxide groups in the epoxide-based matrix, and wherein the stoichiometric amount is in a range of from about 0.5:1 to about 1.5:1, and wherein the mixture comprises reactive species; and
    determining that chloride is present in the at least one biological sample based on detection of a potentiometric signal generated upon reaction between the quaternary ammonium sites on the chloride selective membrane and chloride present in the at least one biological sample.

2. The process of claim 1, wherein the chloride selective electrode is disposed in a sensor comprising a housing, a sensor plate on which the chloride selective membrane is formed, and at least one electrical connector configured to detect the potentiometric signal.

3. The process of claim 2, wherein the sensor is present in a sensor assembly, and wherein the sensor assembly further comprises at least one additional sensor for detecting an ionic species selected from the group consisting of sodium, potassium, magnesium, and calcium.

4. The process of claim 1, wherein the chloride selective membrane is stable for at least 14 days following exposure to the at least one biological sample.

5. The process of claim 1, wherein at least one of:
    the amino compound comprises a tertiary amine, wherein the tertiary amine comprises a member selected from the group consisting of N,N,N',N'-Tetramethyl-1,6-hexanediamine (TMHA); N,N,N',N'-Tetramethyl-2-butene-1,4-diamine (TMBEA); and N,N,N',N'-Tetramethyl-1,4-butanediamine (TMBA);
    the amino compound comprises a tertiary amine, wherein the tertiary amine comprises a polyamine, and wherein an unsaturated and unsubstituted carbon chain is present between two amino groups in the polyamine;
    the activator comprises a mercaptan compound comprising a member selected from the group consisting of pentaerythritol tetrakis (3-mercaptopropionate), Trimethylolpropane tris(3-mercaptopropionate), and ethylene glycol bis(3-mercaptopropionate); and
    the epoxide-based matrix comprises a liquid reaction product between epichlorohydrin and bisphenol A (DER 331).

6. The process of claim 1, wherein the amino compound comprises a tertiary amine, wherein the tertiary amine comprises a member selected from the group consisting of N,N,N',N'-Tetramethyl-1,6-hexanediamine (TMHA); N,N,N',N'-Tetramethyl-2-butene-1,4-diamine (TMBEA); and N,N,N',N'-Tetramethyl-1,4-butanediamine (TMBA).

7. The process of claim 1, wherein the amino compound comprises a tertiary amine, wherein the tertiary amine comprises a polyamine, and wherein an unsaturated and unsubstituted carbon chain is present between two amino groups in the polyamine.

8. The process of claim 1, wherein the activator comprises a mercaptan compound comprising a member selected from the group consisting of pentaerythritol tetrakis (3-mercaptopropionate), Trimethylolpropane tris(3-mercaptopropionate), and ethylene glycol bis(3-mercaptopropionate).

9. The process of claim 1, wherein the epoxide-based matrix comprises a liquid reaction product between epichlorohydrin and bisphenol A (DER 331).

* * * * *